Oct. 12, 1943.                H. GAMACHE ET AL                    2,331,604
                                CULINARY TOOL
                              Filed July 4, 1942
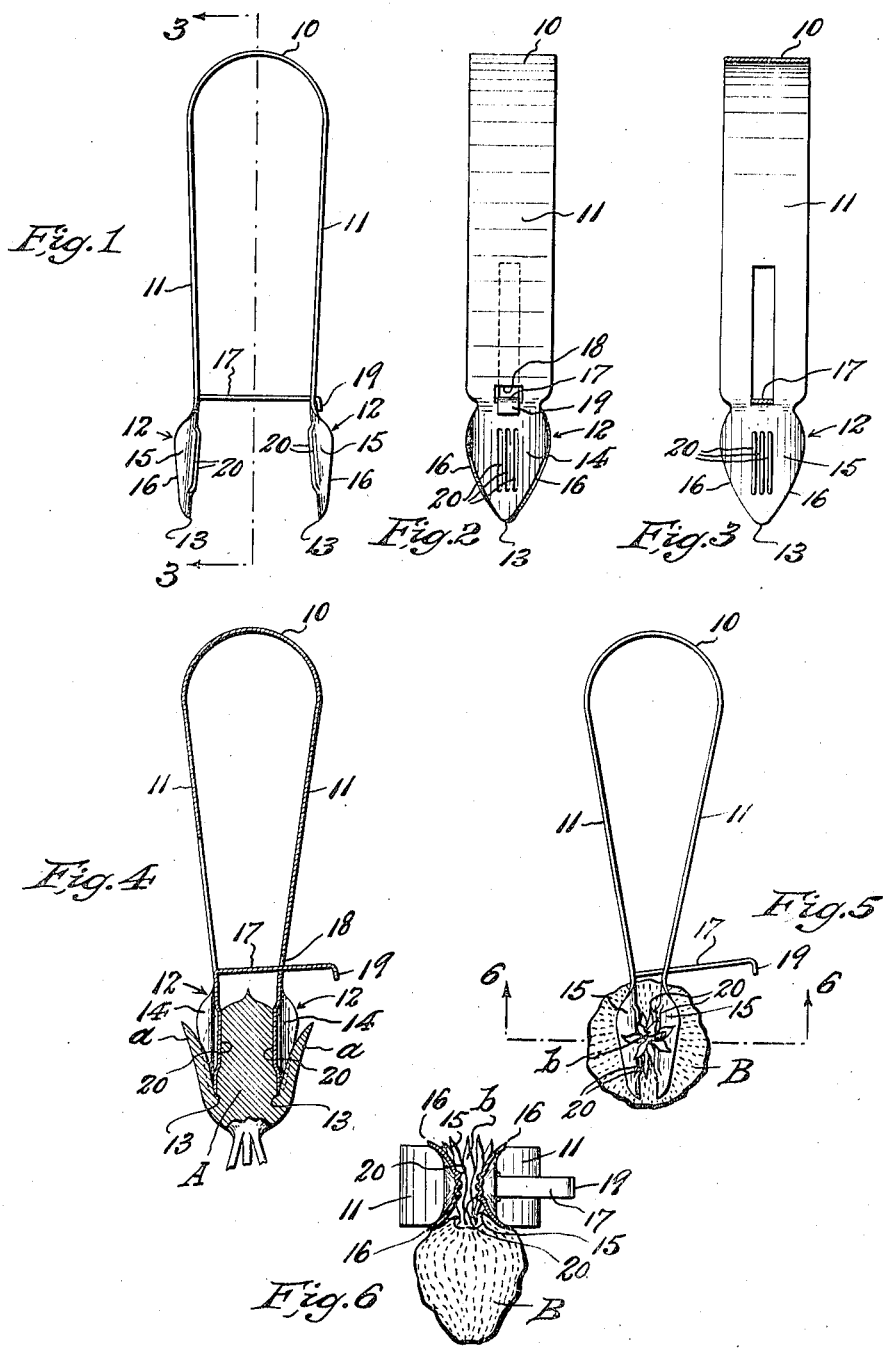
INVENTORS:
Homer Gamache & William C. Kiefer,
BY
George D. Richards, Attorney.

Patented Oct. 12, 1943

2,331,604

UNITED STATES PATENT OFFICE 2,331,604

CULINARY TOOL

Homer Gamache, Newark, and William C. Kiefer, Green Village, N. J.

Application July 4, 1942, Serial No. 449,746

6 Claims. (Cl. 146—54)

This invention relates to an improved culinary tool especially designed for use in cutting radishes and like edible roots into flowerlike forms for decorating and garnishing effects, and additionally useful for hulling strawberries and like fruits.

This invention has for an object to provide a simple, efficient and easily manipulated tool whereby outer parts of a radish or like edible root may be incised to form outcurling leaflike portions radiating from the body thereof, and thus to produce from the radish or the like a flowerlike form which per se is of pleasing and decorative effect, and which may be used to garnish various prepared food dishes for attractive service. To this end the novel tool consists of a pair of opposed spring expanded arms respectively terminating at their ends in laterally tapered spadelike elements of transverse substantially concavo-convex cross-sectional shape, the margins of which are sharpened into knifelike cutting edges, and said elements being preferably so disposed that their concave sides face outwardly; said elements, when the tool is manipulated in use, being adapted to shear downwardly through the skin and outer flesh of opposite sides of a radish or the like so as to cut therefrom outcurling leaflike formations.

The invention has for another object to provide a tool of the kind and for the purposes mentioned which is additionally adapted to be used for gripping and pulling away the involucres of strawberries and like fruit; and to this end said spadelike elements of the tool are provided on their inwardly facing and mutually opposed convex sides with longitudinally disposed gripping ribs.

Other objects of this invention, not at this time more particularly enumerated, will be understood from the following detailed description of the same.

An illustrative embodiment of a culinary tool according to this invention is shown in the accompanying drawing, in which:

Fig. 1 is an edge elevation of the tool; Fig. 2 is a side elevation thereof; and Fig. 3 is a vertical sectional view thereof, taken on line 3—3 in Fig. 1.

Fig. 4 is a sectional view of the tool as manipulated and applied in use to cut a radish into the desired flowerlike form.

Fig. 5 is an elevational view of the tool as manipulated and applied in use to hull a strawberry; and Fig. 6 is a sectional view thereof, taken on line 6—6 in Fig. 5.

Similar characters of reference are employed in the above described views, to indicate corresponding parts.

In the embodiment of the invention shown in the drawing, the tool comprises a U-shaped body formed by an arcuate end portion 10 from opposite sides of which extend the opposed arms 11. Said arms 11 each terminate in spadelike cutting elements which are preferably disposed in angular planes somewhat outwardly divergent from the planes of the respective arms from which they extend. Each spadelike cutting element comprises a body 12 laterally tapering toward and terminating in a more or less pointed free end 13. Each said body 12 is of transverse substantially concavo-convex cross-sectional shape to provide an outwardly facing concave side or outer face 14 and an inwardly facing convex side or inner face 15. The substantially pointed free end 13 and the lateral margins of each body 12 are sharpened to form knifelike cutting edges 16. Means are provided for limiting the outward separating movement of the arms 11 and spadelike cutting elements 12 carried thereby. In an illustrative form of such limiting means, the same comprises a tongue 17 extending from one arm 11 to and through an opening 18 in the other arm 11. The free end of said tongue 17 terminates in an angular stop lug 19 which normally bears against the outer face of the latter arm 11 along a marginal portion of said opening 18 thereof, thus arresting separating or spreading movements of said arms under the tensional urge of the arcuate end portion 10 by which the upper ends thereof are connected.

The tool constructed and formed substantially as above-described may be made of any suitable material, such e. g. as sheet metal, molded plastics such as synthetic resin or resinoid plastics, wood, etc.

Formed in the body 12 of each spadelike elements, to project from the medial longitudinal portion of its convex face 15 are one or more longitudinally extending gripper ribs 20, the purposes of which will be subsequently set forth.

When employing the tool to garnish or decorate a radish or like edible root, the operator grasps the radish A in one hand and the arms 11 of the tool in the other hand, and then by inward pressure upon the arms 11 moves the spadelike elements of the tool toward one another so as to space apart their pointed extremities 13 at a proper distance to engage the outer end of the radish A at points somewhat inward of the sides of the latter. When the spadelike elements of the tool and the radish A are thus initially related, the tool is forced toward the latter so as to cause the extremities 13 of the spadelike elements to pierce the skin and flesh; the penetration of the radish by the spadelike elements being continued so that the lateral cutting edges 16 shear through the skin and adjacent flesh, such cutting action being arrested short of the bottom end of the radish, whereby leaflike formations a are severed from opposite sides of the radish body (see Fig. 4). The tool is then withdrawn, and the radish turned about its longitudinal axis, so that the tool may again be applied thereto, and the operations repeated to produce such additional leaflike formations as may be desired to suitably space the latter around the radish sides. Owing to the somewhat divergent angular pitch of the spadelike elements relative to the arms 11 of the tool, the shearing action tends to follow courses reasonably close to the surface of the radish, especially when lateral squeezing pressure on the arms 11 is gradually relaxed as penetration of the spadelike elements progresses. When the radishes are thus garnished, if before service thereof the same are allowed to soak in cold water for a short time, the outward curling disposition of the leaflike formations *a* will become more pronounced, and a flowerlike effect of very attractive and pleasing appearance is imparted to the radish body.

In addition to its usefulness as a garnishing tool for radishes and the like, the tool is also adapted for efficient service as an implement for hulling strawberries and the like. In such use of the tool, the separated spadelike elements 12 of the tool are applied laterally across the base of the strawberry B so that the involucres *b* extend transversely across and between the opposed convex faces 15 of said spadelike elements, whereupon the latter are squeezed together so as to grip said involucres *b*. The gripping ribs 20 increase the effectiveness of the grasp upon said involucres *b*, whereby an outward pull upon the latter quickly and cleanly removes the same from the body of the strawberry B (see Figs. 5 and 6).

While, for the several uses specified, it is preferable that the concavo-convex spadelike elements 12 be designed with their convex faces inward and mutually opposed, it is quite possible, so far as use of the tool for radish and like garnishing is concerned, to reverse this arrangement so that the concave faces are inward and mutually opposed. For this reason, we deem the respective arrangements of the elements 12 to be optional and within the broad scope of this invention.

From the above description it will be obvious that the instant invention provides a simple, effective and easily manipulated tool for performing the services referred to. We are aware that some changes could be made in the construction and arrangement of the various parts and elements of the tool as above described without departing from the scope of this invention as defined by the following claims. It is therefore intended that all matter shown in the accompanying drawing and above described shall be interpreted as illustrative and not in a limiting sense.

We claim:

1. A culinary tool for the purposes described comprising a pair of tensionally outwardly expanded arms terminating in spadelike elements laterally tapered to provide substantially pointed free ends, said spadelike elements being of transverse substantially uninterrupted concavo-convex cross-sectional shape from base to tip with their inward convex faces opposed and their concave faces outwardly presented, the lateral margins and free ends of said spadelike elements being provided with sharpened cutting edges, and means cooperative with said arms to limit the outward expanding movement thereof.

2. A culinary tool for the purposes described comprising a pair of tensionally outwardly expanded arms terminating in spadelike elements laterally tapered to provide substantially pointed free ends, said spadelike elements being of transverse substantially concavo-convex cross-sectional shape with their inward convex faces opposed, the lateral margins and free ends of said spadelike elements being provided with sharpened cutting edges, and the convex faces of said spadelike elements having gripping projections formed thereon.

3. A culinary tool for the purposes described comprising a pair of tensionally outwardly expanded arms terminating in spadelike elements laterally tapered to provide substantially pointed free ends, said spadelike elements being of transverse substantially concavo-convex cross-sectional shape with their inward convex faces opposed, the lateral margins and free ends of said spadelike elements being provided with sharpened cutting edges, the convex faces of said spadelike elements having gripping projections formed thereon, and means cooperative with said arms to limit the outward expanding movement thereof.

4. A culinary tool for the purposes described comprising a pair of tensionally outwardly expanded arms terminating in spadelike elements laterally tapered to provide substantially pointed free ends, each spadelike element extending from its supporting arm at a somewhat outwardly divergent angle to the plane of the latter, said spadelike elements being of transverse substantially uninterrupted concavo-convex cross-sectional shape with their convex faces inwardly presented and opposed and their concave faces outwardly presented, and lateral margins and free ends of said spadelike elements being provided with sharpened cutting edges.

5. A culinary tool for the purposes described comprising a pair of tensionally outwardly expanded arms terminating in spadelike elements laterally tapered to provide substantially pointed free ends, each spadelike element extending from its supporting arm at a somewhat outwardly divergent angle to the plane of the latter, said spadelike elements being of transverse substantially concavo-convex cross-sectional shape with their inward convex faces opposed, lateral margins and free ends of said spadelike elements being provided with sharpened cutting edges, and the opposed convex faces of said spadelike elements having gripping rib means projecting from and extending along longitudinal medial portions thereof.

6. A culinary tool for the purposes described comprising a pair of tensionally outwardly expanded arms terminating in spadelike elements laterally tapered to provide substantially pointed free ends, each spadelike element extending from its supporting arm at a somewhat outwardly divergent angle to the plane of the latter, said spadelike elements being of transverse substantially concavo-convex cross-sectional shape with their inward convex faces opposed, lateral margins and free ends of said spadelike elements being provided with sharpened cutting edges, the opposed convex faces of said spadelike elements having gripping rib means projecting from and extending along longitudinal medial portions thereof, and means cooperative with said arms to limit the outward expanding movement thereof.

HOMER GAMACHE.
WILLIAM C. KIEFER.